United States Patent
Hernandez et al.

(10) Patent No.: US 9,169,129 B2
(45) Date of Patent: Oct. 27, 2015

(54) COMPOSITION BASED ON CERIUM, ZIRCONIUM AND TUNGSTEN, PREPARATION PROCESS AND USE IN CATALYSIS

(75) Inventors: Julien Hernandez, Antony (FR); Emmanuel Rohart, Amiens (FR); Rui Jorge Coelho Marques, Paris (FR); Deborah Jane Harris, Manchester (GB); Clare Jones, Liverpool (GB)

(73) Assignees: RHODIA OPERATIONS, Paris (FR); MAGNESIUM ELEKTRON LIMITED, Salford (GB)

( * ) Notice: Subject to any disclaimer, the term of this patent is extended or adjusted under 35 U.S.C. 154(b) by 88 days.

(21) Appl. No.: 13/698,659

(22) PCT Filed: May 17, 2011

(86) PCT No.: PCT/EP2011/057954
§ 371 (c)(1),
(2), (4) Date: Jan. 23, 2013

(87) PCT Pub. No.: WO2011/144601
PCT Pub. Date: Nov. 24, 2011

(65) Prior Publication Data
US 2013/0164201 A1    Jun. 27, 2013

(30) Foreign Application Priority Data
May 19, 2010   (FR) ..................................... 10 02111

(51) Int. Cl.
*B01J 21/00*   (2006.01)
*B01J 23/00*   (2006.01)
(Continued)

(52) U.S. Cl.
CPC ............ *C01G 41/006* (2013.01); *B01D 53/944* (2013.01); *B01D 53/9418* (2013.01); *B01J 21/066* (2013.01); *B01J 23/002* (2013.01);
(Continued)

(58) Field of Classification Search
USPC .................................. 502/304, 100, 300, 302
See application file for complete search history.

(56) References Cited

U.S. PATENT DOCUMENTS

| 3,860,529 A * | 1/1975 | Hamling ....................... 252/625 |
| 2005/0059547 A1 * | 3/2005 | Kuno ............................. 502/304 |

(Continued)

FOREIGN PATENT DOCUMENTS

| WO | 2007/088326 A1 | 8/2007 |
| WO | 2008/046920 A1 | 4/2008 |
| WO | 2008/046921 A1 | 4/2008 |

OTHER PUBLICATIONS

Bozo et al., "Characterisation of ceria-zirconia solid solutions after hydrothermal ageing," Applied Catalysis, 2001, pp. 69-77, vol. 220.
(Continued)

*Primary Examiner* — James McDonough

(57) ABSTRACT

A composition based on cerium, zirconium and tungsten is described. The composition has a content expressed as an oxide, of which cerium is from 5% to 30% of the composition, tungsten is from 2% to 17% of the composition, and the remainder of the composition is zirconium. After aging at 750° C. under an air atmosphere including 10% water, it has a two-phase crystallographic structure having a tetragonal zirconia phase and a monoclinic zirconia phase, with no presence of a crystalline phase including tungsten. The composition can be used as a catalyst, especially in an SCR process.

15 Claims, 2 Drawing Sheets

Figure 1:
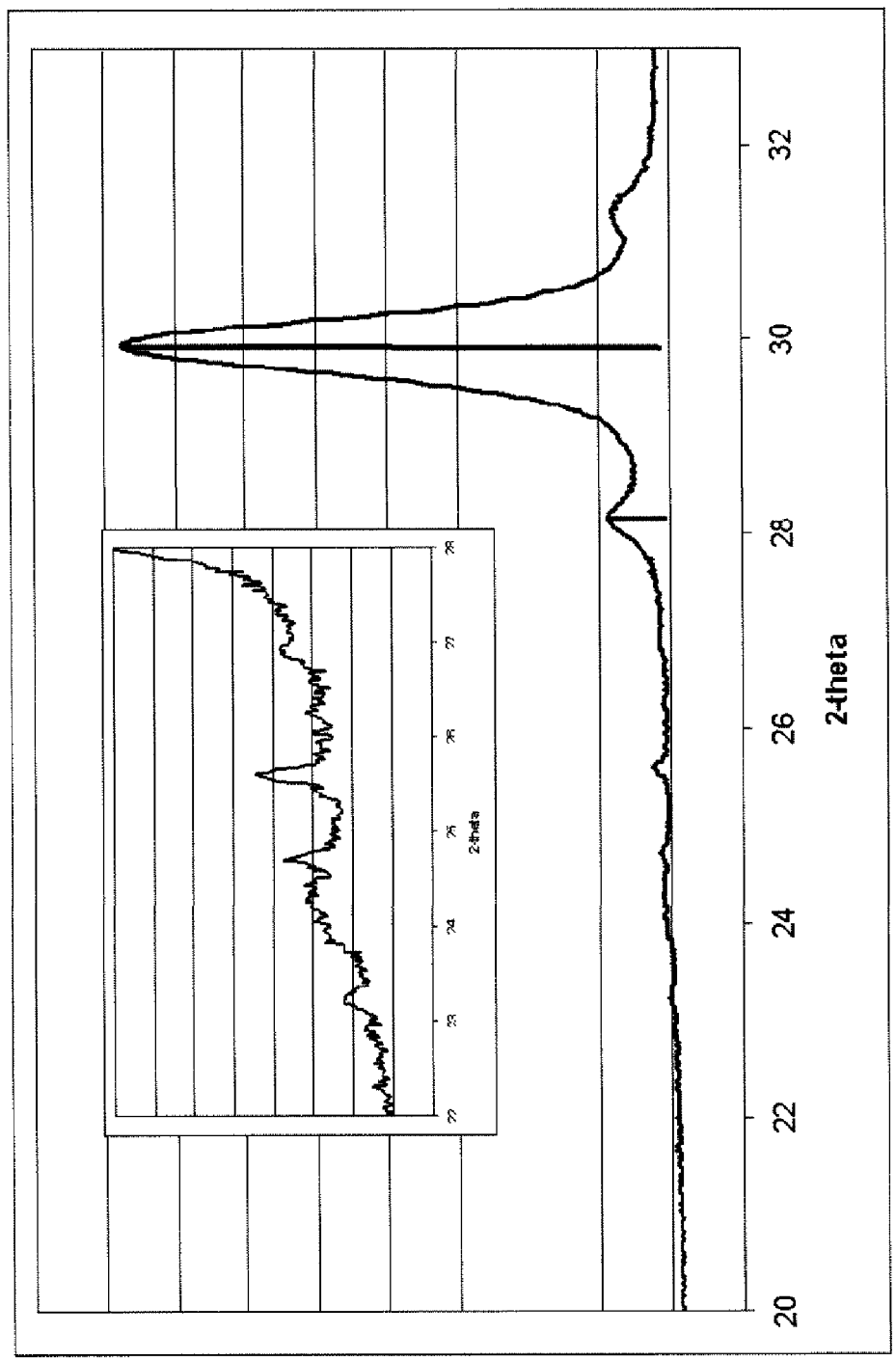

(51) Int. Cl.
  *B01J 23/10* (2006.01)
  *B01J 25/00* (2006.01)
  *B01J 29/00* (2006.01)
  *C01G 41/00* (2006.01)
  *B01D 53/94* (2006.01)
  *B01J 21/06* (2006.01)
  *B01J 23/30* (2006.01)
  *B01J 35/10* (2006.01)
  *C01G 25/00* (2006.01)

(52) U.S. Cl.
  CPC .............. *B01J23/30* (2013.01); *B01J 35/1014* (2013.01); *C01G 25/006* (2013.01); *B01D 2251/2062* (2013.01); *B01D 2251/2067* (2013.01); *B01D 2255/2065* (2013.01); *B01D 2255/20715* (2013.01); *B01D 2255/20776* (2013.01); *B01D 2258/014* (2013.01); *B01J 2523/00* (2013.01); *C01P 2002/52* (2013.01); *C01P 2002/72* (2013.01); *C01P 2002/74* (2013.01); *C01P 2006/12* (2013.01)

(56) References Cited

U.S. PATENT DOCUMENTS

| | | | |
|---|---|---|---|
| 2006/0233691 A1* | 10/2006 | Vanderspurt et al. | 423/263 |
| 2009/0005239 A1* | 1/2009 | Bradshaw et al. | 502/242 |
| 2010/0247407 A1* | 9/2010 | Larcher et al. | 423/213.2 |
| 2010/0247411 A1 | 9/2010 | Larcher et al. | |

OTHER PUBLICATIONS

Duran et al., "A new tentative phase equilibrium diagram for the $ZrO_2$-$CeO_2$ system in air," Journal of Materials Science, 1990, pp. 5001-5005, vol. 25.

Fornasiero et al., "Rh-Loaded $CeO_2$ $ZrO_2$ Solid Solutions as Highly Efficient Oxygen Exchangers: Dependence of the Reduction Behavior and the Oxygen Storage Capacity on the Structural Properties," Journal of Catalysis, 1995, pp. 168-177, vol. 151.

International Search Report issued on Aug. 12, 2011, by the European Patent Office as the International Searching Authority in International Patent Application No. PCT/EP2011/057954.

* cited by examiner

COMPOSITION BASED ON CERIUM, ZIRCONIUM AND TUNGSTEN, PREPARATION PROCESS AND USE IN CATALYSIS

CROSS-REFERENCE TO PRIOR APPLICATIONS

This application is a National Stage of PCT/EP2011/057954, filed May 17, 2011, and designating the United States (published in French on Nov. 24, 2011, as WO 2011/144601 A1; the title and abstract were published in English), which claims priority to FR 10/02111, filed May 19, 2010, each hereby expressly incorporated by reference in its entirety and each assigned to the assignee hereof.

The present invention relates to a composition based on cerium, zirconium and tungsten, to the process for preparing it and to its use in catalysis, especially for treating exhaust gases.

It is known that nitrogen oxides (NOx) are harmful to the environment. The treatment of gases, gases from the engines of vehicles or of fixed installations, which contain these oxides so as to convert them into nitrogen is thus a major challenge.

One known method for performing this treatment is the SCR process in which the reduction of the NOx is performed with ammonia or an ammonia precursor such as urea, in the presence of a catalyst.

However, the efficacy of the SCR process remains to be improved. Thus, catalysts with increased ammonia storage capacity are sought. Moreover, the low-temperature efficacy also remains to be increased. Thus, the catalytic systems currently used for performing this process are often effective only at temperatures above 250° C. Finally, catalysts whose ageing resistance is improved are also sought.

The object of the invention is thus to provide catalysts that are more efficient especially for SCR catalysis.

With this aim, the invention relates to a composition based on cerium, zirconium and tungsten, and which is characterized in that it has the following mass contents, expressed as oxide:
cerium oxide: between 5% and 30%;
tungsten oxide: between 2% and 17%;
the remainder as zirconium oxide;
and in that after ageing at 750° C. in an air atmosphere containing 10% water, it has a two-phase crystallographic structure comprising a tetragonal zirconia phase and a monoclinic zirconia phase, with no presence of a crystalline phase containing tungsten.

The compositions of the invention have the advantage of having both improved NOx conversion capacity and high ammonia adsorption capacity.

Figure 2:
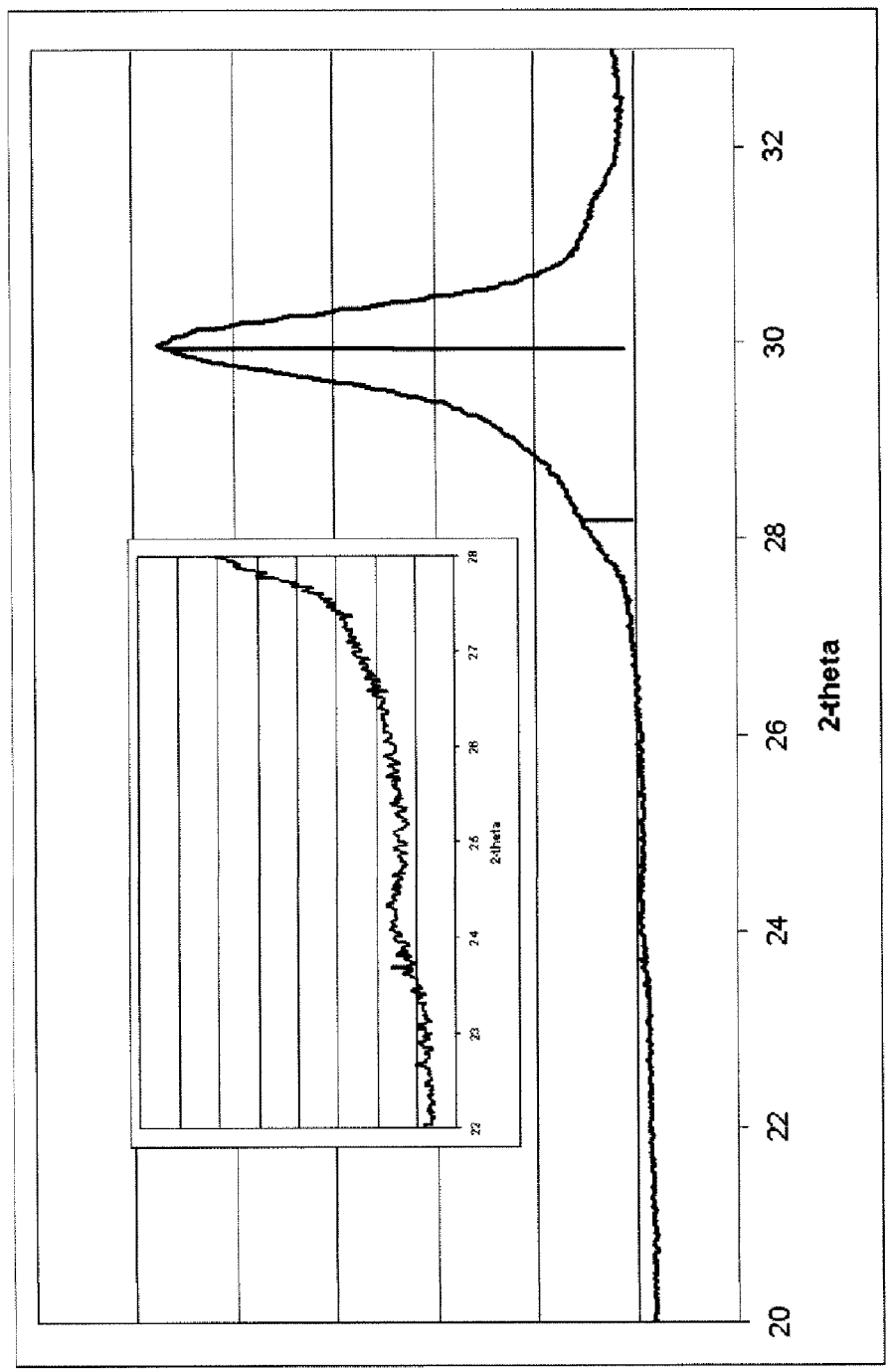

Other characteristics, details and advantages of the invention will emerge even more fully on reading the description that follows, which is made with reference to the attached drawings, in which:

FIG. 1 is an X-ray diagram of a product of the prior art;
FIG. 2 is an X-ray diagram of a product according to the invention.

The term "specific surface area" means the B.E.T. specific surface area determined by adsorption of nitrogen in accordance with standard ASTM D 3663-78 established from the Brunauer-Emmett-Teller method described in the periodical "The Journal of the American Chemical Society, 60, 309 (1938)".

The specific surface area values that are indicated for a given temperature and time correspond, unless otherwise mentioned, to calcinations in air at this temperature stage and over the indicated time.

The calcinations mentioned in the description are calcinations in air, unless otherwise indicated.

The contents are given as mass and as oxide, unless otherwise indicated.

It is also pointed out for the rest of the description that, unless otherwise indicated, within the ranges of values given, the limit values are included.

For the present description, the term "rare-earth elements" means the elements from the group formed by yttrium and the elements of the Periodic Table of atomic number between 57 and 71 inclusive.

The composition of the invention is first characterized by the nature and proportions of its constituents. Thus, it is based on zirconium, cerium and tungsten, these elements being present in the composition generally in the form of oxides. However, it is not excluded for these elements to be present at least partially in another form, for example in the form of hydroxides or oxyhydroxides.

These elements are moreover present in specific proportions that will be given more precisely below and that are expressed as mass of oxide.

Thus, cerium is present in a proportion of between 5% and 30%, more particularly between 10% and 25% and even more particularly between 12% and 22%.

Tungsten is present in a proportion of between 2% and 17% and more particularly between 10% and 15%.

Zirconium constitutes the remainder of the composition.

The invention also relates to the compositions as defined above, but which do not contain one of the metals of the group formed by iron, copper, manganese and rare-earth metals.

The invention also relates to compositions formed essentially by zirconium, cerium and tungsten. This means that they may comprise other elements in the form of traces or impurities, especially such as hafnium, but they do not comprise any other elements that are especially liable to have an influence on their properties of adsorption of $NH_3$ or of resistance to ageing.

Another important characteristic of the compositions of the invention is their crystallographic structure. Specifically, these compositions have a two-phase crystallographic structure.

The description that follows of the structure of the compositions of the invention applies to compositions that have undergone ageing at 750° C. in an air atmosphere containing 10% water over a period of 16 hours. The structure is determined by the X-ray diffraction technique (XRD).

The compositions of the invention have, after such ageing, a two-phase structure, i.e. herein a structure comprising a tetragonal zirconia phase and a monoclinic zirconia phase. The existence of these two phases is demonstrated in a known manner by the presence of the respective peaks described in the JCPDS sheets, i.e. sheet 01-088-2390 for the monoclinic phase or baddeleyite, and, for example, by sheet 01-088-2398 for the tetragonal phase. More particularly, the tetragonal phase may be predominant. Thus, the two abovementioned phases may be present in a ratio of at least 5. This ratio corresponds to the ratio: intensity of the tetragonal phase peak (2-theta peak at about 30°)/intensity of the monoclinic phase peak (2-theta peak at about 28.2°). This ratio may more particularly be at least 7 and even more particularly at least 9.

Moreover, the compositions of the invention do not have any crystalline phase containing tungsten. The term "crystalline phase containing tungsten" means phases corresponding to cerium and/or zirconium tungstates or of the tungsten oxide type $WO_3 \cdot xH_2O$, for example a tungstate of formula $Ce_4W_9O_{33}$ corresponding to the sheet JCPDS 00-025-0192. The term "do not contain" means that the XRD diagrams obtained from these compositions do not reveal the existence, especially in the form of diffraction peaks, of such a phase in a region between 2-theta from 22° to 28°.

Without wishing to be bound by a theory, it may be thought that tungsten is present in the composition of the invention in the form of chemical species of tungstate type $(WO_4)_n$ that are more or less polymerized and stable, since, despite ageing, these species have not reacted with the cerium and zirconium elements of the compositions. If such were not the case, the products of reaction of these species with the abovementioned elements would have been revealed by XRD analysis, which would have shown phases of cerium and/or zirconium tungstate type corresponding to these products.

The compositions of the invention moreover have a large specific surface area, even at high temperature. Thus, after ageing under the temperature, time and atmosphere conditions given above, they have a specific surface area of at least 30 $m^2/g$ and more particularly of at least 40 $m^2/g$. The value of this surface area may be up to about 60 $m^2/g$.

The compositions of the invention have an ammonia adsorption capacity of at least 2.5 ml/g, and this capacity may be more particularly at least 4 ml/g and even more particularly of at least 5 ml/g. The value of this capacity may be up to about 10 ml/g. This adsorption capacity is measured by a temperature-programmed desorption (TPD) method that is described more specifically hereinbelow. It is measured on products calcined at 800° C. for 4 hours.

The process for preparing the compositions of the invention will now be described.

This process is characterized in that a solution or a suspension of a cerium salt or compound is placed in contact or mixed with a compound based on tungsten and on zirconium hydroxide and the product obtained after mixing is then calcined.

This process thus uses a compound based on tungsten and zirconium hydroxide that has been prepared beforehand according to a specific process that will be described more specifically hereinbelow.

Preparation of the Compound Based on Zirconium Hydroxide and Tungsten

This process comprises a first part in which a zirconium hydroxide is prepared. This first part comprises the following steps:
(a) an aqueous solution comprising sulfate anions and a zirconium salt, which may more particularly be zirconium oxychloride, is prepared in proportions such that the ratio $ZrO_2/SO_3$ is between 1/0.40 and 1/0.52,
(b) the solution is cooled to a temperature below 25° C.,
(c) an alkaline compound is added in order to precipitate an amorphous zirconium hydroxide,
(d) the zirconium hydroxide is filtered off and washed with water or an alkaline compound to remove the residual amounts of sulfate and possibly of chloride.

According to a first embodiment of the invention, the compound based on tungsten and zirconium hydroxide may be prepared by mixing this zirconium hydroxide as obtained after step (d) above and resuspended in water with a solution or a suspension of a tungsten salt or compound. This salt may more particularly be ammonium or sodium metatungstate, paratungstate or tungstate, the ammonium salts being preferred herein. The solution or suspension is used in the stoichiometric amounts necessary to obtain the Zr/W mass ratio that is suitable in the desired final composition.

After this mixing, a suspension of a compound based on tungsten and zirconium hydroxide is obtained, which is subjected to a hydrothermal treatment at a pressure of not more than 6 bar, more particularly not more than 3 bar. After the hydrothermal treatment, it is possible, especially in the case of use of a sodium salt as tungsten compound, to separate the solid product from the suspension and to wash it by any known means. This washed product is then resuspended for the hydrothermal treatment.

This hydrothermal treatment consists in heating an aqueous suspension of the compound to a temperature that may especially be above 100° C., at atmospheric pressure or at a higher pressure. The hydrothermal treatment may more particularly be performed at a pressure of 3 bar for 5 hours.

After the hydrothermal treatment, the solid product may again optionally be separated from the suspension thus obtained, and this product may be washed. This product obtained may be either dried to be obtained and stored in solid form, or maintained and stored in the form of a suspension for the rest of the process that will be described later.

According to a second embodiment, the compound based on tungsten and zirconium hydroxide may also be obtained from zirconium hydroxide as obtained after step (d) of the process described above and by mixing, as described previously, a suspension of this zirconium hydroxide with the tungsten salt or compound as described above, but which may most particularly be herein sodium metatungstate. However, in the case of this second mode, the pH of the medium obtained after this mixing is adjusted to a value of between 6 and 8 by adding an acid such as nitric acid. The solid product may then be separated by any known means from the suspension and this product may also be washed.

The product obtained is resuspended in water and this suspension is then subjected to a hydrothermal treatment under the same conditions as those that have been described above, also with a subsequent identical treatment of the product after the hydrothermal treatment.

For the preparation of the zirconium hydroxide according to steps (a) to (d) of the process that has just been described, reference may be made to the entire description of WO 2007/088 326.

The compound based on zirconium hydroxide and tungsten is then used for the preparation of the composition according to the invention according to two variants that will be described below.

Preparation of the Composition According to the Invention

According to a first variant, a solution or a suspension of cerium salts or compounds is first formed.

Inorganic acid salts, such as nitrates, sulfates or chlorides, may be chosen as salts.

It is also possible to use salts of organic acids and especially salts of saturated aliphatic carboxylic acids or salts of hydroxycarboxylic acids. By way of example, mention may be made of formates, acetates, propionates, oxalates and citrates.

It is also possible to use cerium in the form of a sol or a colloidal suspension. The terms "colloidal suspension" and "sol" denote herein any system formed from fine solid particles, generally of cerium oxide or oxyhydroxide, of colloidal dimensions, i.e. particles whose size is generally between 1 nm and 50 nm and more particularly between 1 nm and 20 nm. The sizes given herein are measured by the light scattering technique. These particles are in stable suspension in a liquid phase.

The dried compound based on tungsten and zirconium hydroxide, in solid form as obtained via the process described previously, is then impregnated with the cerium solution or suspension. The solution or suspension is used in the stoichiometric amounts required to obtain the appropriate Zr/Ce mass ratio in the desired final composition.

Dry impregnation is more particularly used. Dry impregnation consists in adding to the product to be impregnated a volume of an aqueous solution or suspension of the element that is equal to the pore volume of the solid to be impregnated.

After impregnation, a compound based on zirconium hydroxide and based on cerium and tungsten is obtained, which may optionally be dried. This compound is then calcined. The calcination takes place at a temperature that may be between, for example, 300° C. and 800° C. and more particularly between 500° C. and 800° C. This calcination is generally performed in air.

According to a second variant, the starting material used is the compound based on tungsten and zirconium hydroxide as obtained in the process described above, in the form of a suspension in water. This suspension is then mixed with a solution or suspension of a cerium compound of the same type as that described above.

The mixture thus obtained is then dried, for example by atomization. The term "drying by atomization" means drying by spraying the mixture in a hot atmosphere (spray-drying). The atomization may be performed using any sprayer known per se, for example a spray nozzle of the water sprinkler type or the like. Turbine atomizers may also be used. As regards the various spraying techniques that may be used in the present process, reference may be made especially to Masters' fundamental publication entitled "Spray-Drying" (second edition, 1976, published by George Godwin—London).

The product dried especially by atomization is then calcined under the same conditions as those that have just been described for the first process.

The compositions of the invention as described above or as obtained via the preparation process described previously are in the form of powders, but they may optionally be formed so as to be in the form of granules, beads, cylinders or honeycombs of variable sizes.

These compositions may be used with any material usually employed in the field of catalyst formulation, i.e. especially thermally inert materials. This material may be chosen from alumina, titanium oxide, cerium oxide, zirconium oxide, silica, spinels, zeolites, silicates, crystalline silicoaluminium phosphates and crystalline aluminium phosphates.

The compositions may also be used in catalytic systems comprising a coating (wash coat) with catalytic properties and based on these compositions with a material of the type mentioned above, the coating being deposited onto a substrate of the metallic monolith type, for example, such as FerCralloy, or of ceramic, for example of cordierite, silicon carbide, alumina titanate or mullite.

This coating is obtained by mixing the composition with the material so as to form a suspension that may then be deposited onto the substrate.

The catalytic system in which the compositions of the invention may be used may also comprise a zeolite. The zeolite may be natural or synthetic and it may be of aluminosilicate, aluminophosphate or silicoaluminophosphate type.

In the case of a zeolite of aluminosilicate type, this zeolite may have an Si/Al atomic ratio of at least 10 and more particularly of at least 20.

According to one more particular embodiment of the invention, the zeolite comprises at least one other element chosen from the group comprising iron, copper and cerium.

The term "zeolite comprising at least one other element" means a zeolite in whose structure has been added by ion exchange, impregnation or isomorphic substitution one or more metals of the abovementioned type.

In this embodiment, the metal content may be between about 1% and about 5%, the content being expressed as mass of metal element relative to the zeolite.

As zeolites of the aluminosilicate type that can be included in the constitution of the catalytic system of the invention, mention may be made more particularly of those chosen from the group comprising beta zeolites, gamma zeolites, ZSM 5 and ZSM 34. For the zeolites of aluminophosphate type, mention may be made of those of the type SAPO-17, SAPO-18, SAPO-34, SAPO-35, SAPO-39, SAPO-43 and SAPO-56.

The catalytic system with zeolite that has just been described may comprise a coating of the type described above, which especially contains a compound obtained by simple physical mixing of a composition according to the invention and zeolite.

The invention moreover relates to a process for treating a gas for the conversion of nitrogen oxides into nitrogen by placing the gas in contact with a nitrogenous reducing agent. This process is characterized in that a composition based on cerium, zirconium and tungsten or a catalytic system according to the invention and as described above is used as catalyst.

This is a process of SCR type, which is well known to those skilled in the art.

The nitrogenous reducing agent may be ammonia, hydrazine or any suitable ammonia precursor, such as ammonium carbonate, urea, ammonium carbamate, ammonium hydrogencarbonate, ammonium formate or organometallic compounds containing ammonia. Ammonia or urea may be chosen more particularly.

The process may be performed for the treatment of a gas originating from an internal combustion engine (mobile or stationary) especially a motor vehicle engine, or from gas originating from a gas turbine, from power stations running on coal or fuel or from any other industrial installation.

According to one particular embodiment, the process is used for treating the exhaust gas of a lean-burn internal combustion engine or of a diesel engine.

By virtue of the use of the composition or of the catalytic system of the invention, the gas treatment process may begin to be efficient at relatively low temperatures. For example, at gas temperatures of 250° C., conversion of NOx into nitrogen in this temperature range may be observed at a level that may thus be at least 30%.

Moreover, the catalytic compositions and systems of the invention may also be used, as catalysts, for the treatment of a gas for the catalytic oxidation of carbon monoxide and of hydrocarbons that are contained in this gas. The gases that may be treated in the context of the present invention are, for example, those derived from gas turbines, from the boilers of thermal power stations or from internal combustion engines of motor vehicles. It is moreover a case of oxidation of the abovementioned compounds with oxygen, i.e. the reactions:

$$CO + \tfrac{1}{2} O_2 \rightarrow CO_2 \qquad (1)$$

$$HC \text{ (hydrocarbon)} + O_2 \rightarrow CO_2 + H_2O \qquad (2)$$

The oxygen here is the excess oxygen from the gases, since the process is applied in a medium that is generally rich in oxygen, but which may nevertheless be temporarily poor in oxygen. Specifically, the gases that are treated via this process have an excess of oxygen relative to the amount required for the stoichiometric combustion of the combustibles or fuels, and, more precisely, these gases have an excess of oxygen relative to the stoichiometric value λ=1. They are therefore gases for which the value of λ is greater than 1. This value λ is correlated to the air/fuel ratio in a manner known per se especially in the field of internal combustion engines. Such gases may be those of lean-burn petrol engines, which have an oxygen content (expressed as volume), for example, of at least 2%, and also those that have an even higher oxygen content, for example the gases of engines of diesel type, i.e. at least 5% and more particularly at least 10%, this content possibly being, for example, between 5% and 20%.

It will be noted that, besides the oxidation reactions (1) and (2) mentioned above, the process may also, during the treatment of the gases, use an oxidation of the soluble organic fraction, i.e. the liquid hydrocarbons originating from the fuel and from the lubricant oil and that are adsorbed onto the particles of soot produced by the engine, and also an oxidation of oxygenated compounds, for instance aldehydes, into carbon dioxide and water.

Besides the uses mentioned above, the catalytic systems and compositions of the invention may also be used as catalyst for the hydrolysis of urea.

The catalytic compositions and systems of the invention may further be used in combination with catalytic systems of NOx trap type or of HC DeNOx type for the selective reduction of NOx by hydrocarbons and also as an $NH_3$ slip catalyst.

Finally, the catalytic systems and compositions of the invention may be used as catalyst on catalysed particle filters.

Examples will now be given.

In these examples, the adsorption capacity of the products is measured via the TPD method that is described below.

Temperature-Programmed Desorption (TPD) Method

The probe molecule used for characterizing the acidic sites in TPD is ammonia.

Preparation of the Sample:

The sample is brought to 500° C. under a stream of helium at a temperature increase rate of 20° C./minute and is maintained at this temperature for 30 minutes so as to remove the water vapour and thus to avoid blocking the pores.

Finally, the sample is cooled to 100° C. under a stream of helium at a rate of 10° C./minute.

Adsorption:

The sample is then subjected to a stream of ammonia at 100° C. for 30 minutes. The sample is subjected for a minimum of 1 hour to a stream of helium.

Desorption:

The TPD is performed by effecting a temperature increase rate of 10° C./minute up to 700° C.

During the rise in temperature, the concentration of the desorbed species, i.e. ammonia, is recorded.

Characterization of the Materials

The properties of the compositions are evaluated under the following conditions.

The compositions were aged. Ageing consists in continuously circulating a synthetic gas mixture of air containing 10% by volume of $H_2O$ in a reactor containing the composition. The reactor temperature is maintained at 750° C. for a steady stage of 16 hours.

The aged compositions are then evaluated in a catalytic test. In this test, a synthetic mixture (30 L/h) representative of the application (Table 1) is passed over the composition (90 mg).

TABLE 1

| Composition of a representative mixture | |
|---|---|
| $NH_3$ | 500 vpm |
| NO | 500 vpm |
| $O_2$ | 13 vol % |
| $H_2O$ | 5 vol % |
| $N_2$ | Remainder |

The conversion of the NOx is monitored as a function of the temperature of the composition.

COMPARATIVE EXAMPLE 1

This example describes a composition that is prepared via a process in which a compound based on cerium and zirconium hydroxides prepared beforehand is impregnated with a metatungstate solution.

An amount of 153 g of a zirconium sulfate solution (17.3% by weight as $ZrO_2$) and 40 g of a cerium nitrate solution (20% by weight as $CeO_2$) is mixed with 4 liters of water. An alkaline solution (6N aqueous ammonia) is then added to this mixture to adjust the pH to a value of 9.5. The precipitate formed is recovered by filtration and is then impregnated with 11.2 g of ammonium metatungstate solution (50% by weight as $WO_3$). The impregnated product is then calcined at a temperature of 800° C. (steady stage of 4 hours, temperature rise of 4° C./minute).

The product obtained corresponds to the following mass composition:
cerium oxide: 20%
zirconium oxide: 66%
tungsten oxide: 14%

After the calcination given above it has a specific surface area of 24 $m^2/g$.

The X-ray diagram shows that the product is in the form of a predominantly tetragonal cerium/zirconium mixed oxide phase and of a cubic cerium oxide phase. There is no monoclinic phase.

COMPARATIVE EXAMPLE 2

This example describes a composition that is prepared via a process in which a compound based on cerium and zirconium oxides prepared beforehand is impregnated with a metatungstate solution.

The starting material is a cerium zirconium oxide with a cerium oxide mass content of 15% and a zirconium oxide mass content of 85% and a specific surface area of 100 $m^2/g$. It is in the form of a pure crystallographic phase corresponding to a tetragonal zirconia. An aqueous ammonium metatungstate solution is moreover prepared.

10 g of the above mixed oxide are impregnated (dry impregnation) with the ammonium metatungstate solution. The product is then oven-dried at 120° C. for 1 hour. The product is then calcined at 800° C. (steady stage of 4 hours, temperature rise of 4° C./minute).

The product obtained corresponds to the following mass composition of oxide:
cerium oxide: 13%
zirconium oxide: 72%
tungsten oxide: 15%

After the calcination given above it has a specific surface area of 44 $m^2/g$.

EXAMPLE 3

This example concerns a composition based on zirconium, cerium and tungsten oxides according to the invention in the following oxide mass proportions: 74%, 15% and 11%, respectively.

A zirconium hydroxide is prepared according to Example 3 of WO 2007/088326. Before the hydrothermal treatment, a suspension is formed from precipitated and washed zirconium hydroxide (containing 100 g as $ZrO_2$) and 220 g of an aqueous ammonium metatungstate solution (containing 8% as $WO_3$) are added thereto. A hydrothermal treatment is then performed at 3 bar for 5 hours. After the hydrothermal treatment, the suspension obtained is diluted with deionized water to a total volume of 1 L. 103 g of a cerium (III) nitrate solution (containing 20.3 g as $CeO_2$) is gradually added thereto. The medium obtained is dried by atomization with a laboratory atomizer at a gas inlet temperature of 100° C. The dried hydroxide is then calcined in air at 800° C. (steady stage of 2 hours, temperature rise of 4° C./minute).

After the calcination given above, it has a specific surface area of 62 m²/g.

The X-ray diagram shows that the product is in the form of a tetragonal cerium/zirconium mixed oxide phase and of a monoclinic phase. The tetragonal/monoclinic ratio is 9. No crystalline phase containing tungsten is observed.

EXAMPLE 4

This example concerns a composition based on zirconium, cerium and tungsten oxides according to the invention in the following oxide mass proportions: 68%, 20% and 12%, respectively.

The process is performed as in Example 3, but using 220 g of an aqueous sodium metatungstate solution (containing 8% $WO_3$). The pH of the medium is then adjusted to a value of 7 with dilute nitric acid (30% $HNO_3$). The solid product obtained is separated from the aqueous phase, washed with water and then resuspended to be subjected to a hydrothermal treatment under the same conditions as in Example 3. After the hydrothermal treatment, 168 g of the compound based on zirconium hydroxide and tungsten thus obtained are dried. This compound is impregnated with 128 g of a cerium(III) nitrate solution (containing 29.4 g as $CeO_2$). The product obtained after the impregnation step is calcined in air at 800° C. (steady stage of 2 hours, temperature rise of 4° C./minute).

After the calcination given above, it has a specific surface area of 60 m²/g.

Table 2 below gives for each of the compositions of Examples 1 to 4:
- the specific surface area after ageing at 750° C. for 16 hours under an atmosphere of air containing 10% water;
- the crystallographic structures after ageing under the same conditions;
- the ammonia adsorption capacities of the compositions after calcination in air at 800° C.;
- the degree of conversion of NOx measured during the evaluation under the conditions described above.

TABLE 2

| Example | Specific surface area m²/g | Crystallographic structure* | NH₃ adsorption capacity (ml/g) | % NOx conversion at 250° C. |
|---|---|---|---|---|
| 1 comparative | 23 | No phase M No phase W | 2.1 | 38 |
| 2 comparative | 36 | Phases Q and M Q/M = 9 Presence of phase W | 3.8 | 26 |
| 3 | 43 | Phases Q and M | 5.3 | 42 |

TABLE 2-continued

| Example | Specific surface area m²/g | Crystallographic structure* | NH₃ adsorption capacity (ml/g) | % NOx conversion at 250° C. |
|---|---|---|---|---|
| 4 | 44 | Q/M = 9 No phase W Phases Q and M Q/M = 9 No phase W | 5.7 | 50 |

*Q: tetragonal phase
M: monoclinic phase
W: crystalline phase containing tungsten
Q/M: ratio of the tetragonal phase to the monoclinic phase measured by the ratio of the intensities of the peaks as described above.

It is seen that the compositions of the invention have improved efficacy for the conversion of NOx relative to comparative compositions, even at a temperature as low as 250° C. Moreover, due to their increased $NH_3$ adsorption capacity, they have the advantage of reducing the risk of leakage of ammonia during the running of an engine, for example. In addition, this improved adsorption capacity enables the catalytic system to be efficient even in periods of running in which there is no injection of ammonia.

The attached FIG. 1 is the X-ray diagram of the product of Comparative Example 2 after ageing at 750° C. for 16 hours in an atmosphere of air containing 10% water. This diagram shows that the product is in the form of a tetragonal cerium/zirconium mixed oxide phase (2-theta peak at about 30°) and of a monoclinic phase (2-theta peak at about 28.2°). The tetragonal/monoclinic ratio obtained by determining the ratio of the heights of the two abovementioned peaks (these heights are given as thick lines on the diagram) is 9. The insert in the diagram, which shows a magnification of the region from 2-theta 22° to 2-theta 29°, reveals crystalline phases containing a tungstate of formula $Ce_4W_9O_{33}$ at 2-theta 23.2°; 24.7°; 25.6° and 26.9°.

FIG. 2 is the X-ray diagram of the product of Example 4 after ageing at 750° C. for 16 hours in an atmosphere of air containing 10% water. This diagram shows, via the same peaks as in FIG. 1, that the product is in the form of a tetragonal cerium/zirconium mixed oxide phase and of a monoclinic phase. The tetragonal/monoclinic ratio, measured as in FIG. 1, is 9. The insert, which corresponds to the same magnification as in FIG. 1, shows that no crystalline phase containing tungsten is observed here.

The invention claimed is:

1. A composition comprising cerium, zirconium and tungsten, wherein the composition has the following mass contents, expressed as oxide:
   cerium oxide: from 5% to 30%;
   tungsten oxide: from 2% to 17%;
   the remainder as zirconium oxide;
   and in that after aging at 750° C. in an air atmosphere comprising 10% water, it has a two-phase crystallographic structure comprising a tetragonal zirconia phase and a monoclinic zirconia phase, with no presence of a crystalline phase comprising tungsten.

2. The composition as defined in claim 1, wherein after aging, the composition has a specific surface area of at least 30 m²/g.

3. The composition as defined in claim 1, wherein after aging, the composition has a specific surface area of at least 40 m²/g.

4. The composition as defined in claim 1, wherein the composition has a two-phase crystallographic structure in which the tetragonal zirconia phase and the monoclinic zirconia phase are in a ratio of at least 5.

5. A process for preparing a composition as defined in claim 1, wherein the process is comprised of the following steps:
   (a) preparing an aqueous solution comprising sulfate anions and a zirconium salt, which can optionally be zirconium oxychloride, in proportions such that the ratio $ZrO_2/SO_3$ is from 1/0.40 to 1/0.52,
   (b) cooling the solution to a temperature below 25° C.,
   (c) adding an alkaline compound to precipitate an amorphous zirconium hydroxide,
   (d) filtering off the zirconium hydroxide and washing with water or an alkaline compound to remove the residual amounts of sulfate,
   (e) mixing the zirconium hydroxide obtained from step (d) with a solution or a suspension of a tungsten salt or compound,
   (f) subjecting the mixture obtained in step (e) to a hydrothermal treatment at a pressure of not more than 6 bar, via which a compound comprising tungsten and zirconium hydroxide is obtained, which can be either dried to be obtained in solid form or maintained in the form of a suspension,
   (g) impregnating either the solid compound comprising tungsten and zirconium hydroxide with a solution or a suspension of cerium salts or mixing compounds, or the compound comprising tungsten and zirconium hydroxide in the form of a suspension with a solution or a suspension of cerium salts or compounds, and
   (h) calcining the compound comprising tungsten and zirconium hydroxide after impregnation, or drying and calcining the suspension obtained from mixing the compound comprising tungsten and zirconium hydroxide with the solution or suspension of cerium salts or compounds obtained in step (g).

6. The process as defined in claim 5, wherein after step (e), the pH of the mixture obtained is adjusted to a value of 6 to 8 by adding an acid.

7. The process as defined in claim 5, wherein step (h), drying of the suspension is performed by atomization.

8. A catalytic system comprising the composition as defined in claim 1.

9. The catalytic system as defined in claim 8, wherein the catalytic system also comprises a zeolite.

10. A process for treating a gas for the conversion of the nitrogen oxides into nitrogen, the process comprising placing the gas in contact with a nitrogenous reducing agent, wherein a catalytic system or composition according to claim 1 is used.

11. The process as defined in claim 10, wherein ammonia or urea is used as the nitrogenous reducing agent.

12. A process for treating a gas for the catalytic oxidation of carbon monoxide and hydrocarbons therein, the process comprising using a catalytic system according to claim 1.

13. The process as defined in claim 10, wherein an exhaust gas of a motor vehicle engine is treated.

14. A process for treating a gas for conversion of nitrogen oxides into nitrogen, the process comprising placing the gas in contact with a nitrogenous reducing agent, wherein the conversion uses a composition as defined in claim 1.

15. A process for treating a gas for catalytic oxidation of carbon monoxide and hydrocarbons therein, the process comprising using a composition as defined in claim 1.

* * * * *